UNITED STATES PATENT OFFICE.

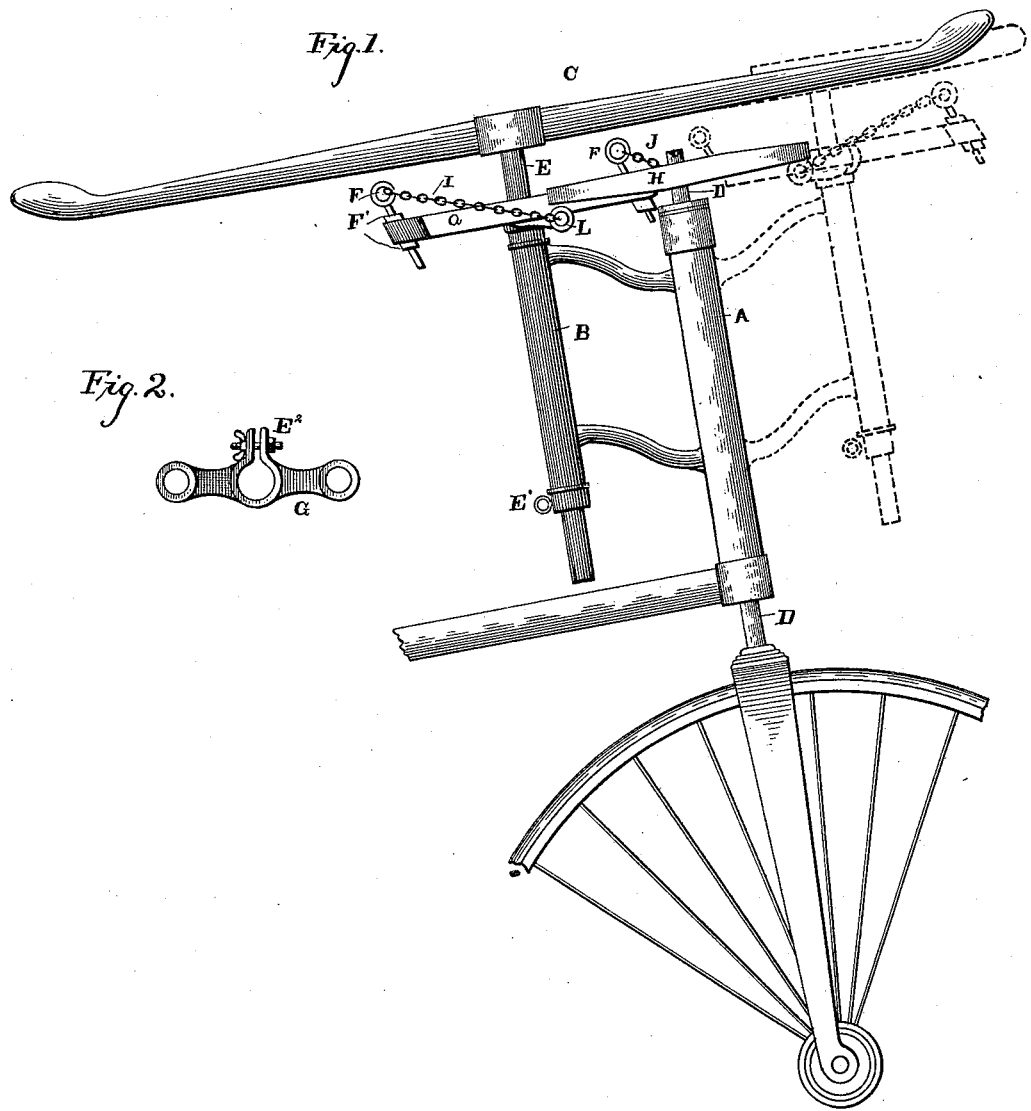

WILLIAM GOULDEN, OF LEA BRIDGE ROAD, CLAPTON, COUNTY OF MIDDLESEX, ENGLAND.

VELOCIPEDE.

SPECIFICATION forming part of Letters Patent No. 400,075, dated March 26, 1889.

Application filed December 20, 1887. Serial No. 258,533. (No model.) Patented in England October 18, 1887, No. 14,144; in France November 19, 1887, No. 174,166, and in Germany November 19, 1887, No. 15,162.

*To all whom it may concern:*

Be it known that I, WILLIAM GOULDEN, a citizen of England, residing at Lea Bridge Road, Clapton, in the county of Middlesex and Kingdom of Great Britain, have invented new and useful Improvements in the Steering Mechanism of Velocipedes, (for which I have obtained a patent in Great Britain, No. 14,144, bearing date October 18, 1887; in France, No. 174,166, November 19, 1887, and in Germany, No. 15,162, November 19, 1887,) of which the following is a specification.

This invention is an improvement on the devices covered by my prior application, Serial No. 254,652, November 8, 1887, whose object is to nullify vibrations and shocks in velocipedes.

The improvements herein referred to are to render practicable the application of the apparatus forming the subject of my former application aforesaid, to front steering and other velocipedes, and in applying it in such a manner as to isolate the guiding bar or handle from the steering-wheel and render practically *nil* the vibrations and shocks communicated through this and other wheels to the bar or handle of the machine and to the seat. The method I adopt in effecting this object will be clearly understood by the following description of my invention, aided by the accompanying drawings, of which—

Figure 1 represents a side view of that portion only of a front-steering velocipede to which my invention relates. Fig. 2 is a plan shown in detail of an adjustable clip, hereinafter described.

I connect the two tubes or cylinders A and B at any convenient distance apart by means of any suitable connection. The tube A is the cylinder with stuffing-boxes at its ends, forming the apparatus described in my hereinbefore recited British and American patents, while the tube B forms a separate pillar, on which I mount the guide bar or handle C. This pillar can be placed either as represented in the drawings accompanying this specification, or it may occupy a position in front of the tube or cylinder A, as shown by the dotted lines. Within each of these tubes or cylinders are rods D E, the rod D being the rod described in my before-mentioned application as the piston-rod, and the rod E being a rod capable of vertical adjustment for regulating the height of the handle-bar by means of the clips E', at the lower end of the tube B, and E² (seen in detail, Fig. 2,) forming part of the cross-bar G, mounted on the rod E. Through the ends of this cross-bar ring-bolts F F are passed, which are adjustable by aid of the nuts F' F'. Another cross-bar, H, is mounted at the top of the rod D of the cylinder A. At each end of this cross-bar is a ring, I I, and passing through these rings and those of the bolts F F are chains J J with universal joints, or some equivalent capable of vertical up-and-down motion, but which are rigid laterally. These two cross-bars G H are parallel one with the other and equidistant. By loosening the clips E' E² the height of the handle-bar can be regulated, or turned sidewise when required for resting the velocipede against a wall, so that this bar can be turned flush with the wall or other structure, so that the machine can rest close and firmly against it. By this means the course of the steering wheel or wheels can be maintained in any direction.

By the method of isolating the handle-bar from the steering-wheel, as herein described, and mounting it on a separate pillar situated in front or rear of the cylinder A, and by connecting the movements of the handle-bar with the steering-wheel by means of the cross-bars G H and chains J J, with universal joints capable of an up-and-down motion, but rigid laterally, or some equivalent method of uniting these two cross-bars, the machine is readily and easily guided and shock and vibrations are rendered practically *nil*. The handle-bar can be readily removed or turned parallel with the wheels.

I am aware that rigid rods, chains, and ropes have been employed for the purpose of guiding wheels of velocipedes, but the latter have been rigid in the frame. I therefore make no claim, broadly, for such rods, chains, or ropes; but What I do claim is—

1. In combination with the steering-wheel of a velocipede and the rod D rising therefrom, the rod E, the steering-handle C, mounted thereon, the cross-bars G H on said shafts, the chains J, extending from one of said cross-bars to the other, and the joints connecting said chains to said cross-bars, these joints having up-and-down motion, but rigidly laterally, substantially as set forth.

2. In combination with the steering-wheel of a velocipede and a rod, D, connecting thereto a second rod, E, having a steering-handle thereon, cross-bars on said rods, connections between said cross-bars, a hollow cylinder, B, which holds said rod and clips E' E², and their thumb-screws for adjusting rod E, substantially as set forth.

3. The method of adjustment of the rod E of the cylinder B, for raising or lowering the handle-bar C or turning it on one side or parallel with the wheels by aid of the clips E' E² and thumb-screws Fig. 2.

London, the 3d day of December, 1887.

WILLIAM GOULDEN.

Witnesses:
JOHN A. DONNISON,
HERBERT FURMAGE CHYNALL.